C. F. BERTIG.
MEANS FOR PREVENTING THEFT OF CURRENT FROM ELECTRIC METERS.
APPLICATION FILED MAR. 11, 1912.
1,041,728. Patented Oct. 22, 1912.
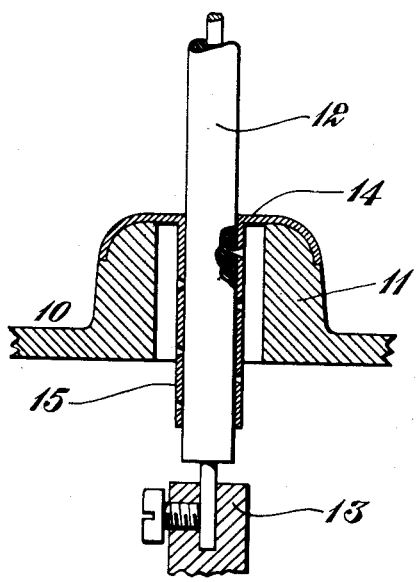
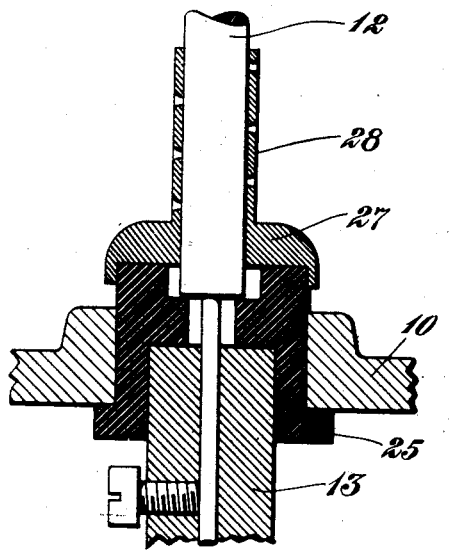
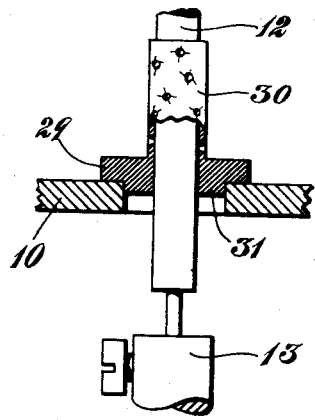
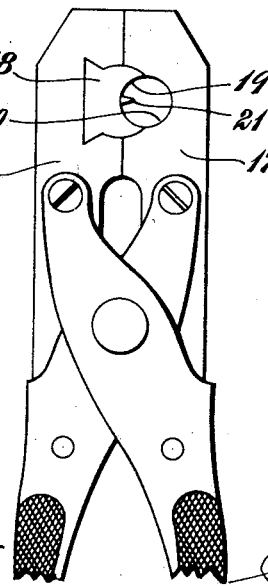
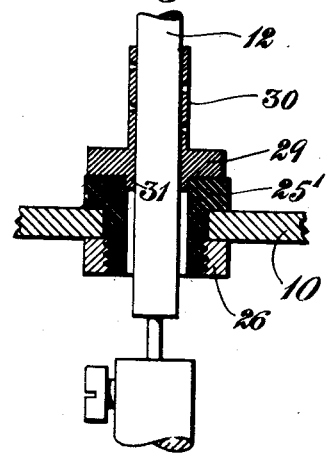
Witnesses:
L. L. Markel.
M. L. Glynn
Inventor:
Chas. F. Bertig
By his Attorneys,
Sutherland & Sutherland

UNITED STATES PATENT OFFICE.

CHARLES F. BERTIG, OF WINSTED, CONNECTICUT.

MEANS FOR PREVENTING THEFT OF CURRENT FROM ELECTRIC METERS.

1,041,728.

Specification of Letters Patent.

Patented Oct. 22, 1912.

Application filed March 11, 1912. Serial No. 682,887.

*To all whom it may concern:*

Be it known that I, CHARLES F. BERTIG, a citizen of the United States, residing at Winsted, in the county of Litchfield and State of Connecticut, have invented certain new and useful Improvements in Means for Preventing Theft of Current from Electric Meters, of which the following is a specification.

This invention relates to means for preventing theft of current from electric meters.

An electric meter as is well-known involves a casing in which is inclosed the meter mechanism and lead wires extend into this casing and are electrically connected therein with the meter mechanism, it being customary to connect the inner terminals of said wires with binding posts and the wires at and around such connection are bared or stripped of their insulation. It is a common thing especially in some sections to introduce wires into the meter casing and to bring these wires into contact with the lead wires where they are thus bared and in this way divert the current away from the meter mechanism, and along the wires thus wrongfully passed into the casing.

It is the primary purpose of the present invention to provide simple and effective means for preventing the passing of wires into the casing from a point outside of the same, and owing to this advantage I can prevent positively the theft and robbery of current.

In the drawings accompanying and forming part of the present specification I have shown several of the many convenient forms of embodiment of the invention which I will set forth in detail in the following description, this disclosure being provided to enable those skilled in the art to practice the invention. I may, however, depart from this showing in several respects within the scope of the invention covered in the claims following said description.

Referring to said drawings: Figures 1, 2, 3 and 4 are sectional views of portions of an electric meter provided with means for preventing diversion of current, including my invention, and, Fig. 5 which is on a larger scale than the other views, is an elevation of an implement hereinafter more particularly described.

Like characters refer to like parts throughout the several figures of the drawings.

Referring first to Fig. 1, the numeral 10 denotes a meter or at least a portion thereof, and said meter may have at any suitable point outwardly extending hubs or bosses 11 through which lead wires as 12 extend for connection with binding posts as 13 in the meter, the wire 12 shown in said Fig. 1 being bared where it is connected with its binding post. It will be seen that there is a space between the wire 12 and the hub 11. or other opening through which said wire extends into the meter, and through this space and a similar space, wires can be projected and be brought into contact with the two binding posts 13 or the bared ends of the lead wires to an extent sufficient to make a proper electrical connection, and in this case current will not pass through the meter mechanism and hence will not be measured, the result being in such an event that the company will be robbed. To prevent the possibility in an effective, thorough manner I provide each lead wire with a barrier which may be of any suitable kind, but which preferably covers fully the opening through which said wire extends. In Fig. 1 the barrier is denoted by 14, and it is shown as consisting of a disk or cup of concavo-convex form, the concaved side of the disk being fitted to and countersunk in the outer portion of the hub or boss 11. This disk, cap or barrier 14 closely fits around the wire 12, and it will, therefore, be evident that it is absolutely impossible to pass a wire or anything like it through the opening of the meter 10 through which the wire 12 extends. Although the barrier 14 is shown as constituting a separate part, this in all cases is not essential. The disk 14 is represented as provided with an inwardly extending tube or sleeve 15 which in the construction illustrated is integral with the disk and through this tube or sleeve the wire 12 extends, the sleeve or tube being rigidly secured to the wire, and for this purpose any suitable means may be provided, although the tool shown in Fig. 5 is quite satisfactory in this connection. This tool comprises a pair of jaws 16 and 17, the jaw 16 having fitted therein the die member 18 having a circular seat 19 adapted to mate with a circular seat 20 in the jaw 17, and when the two seats 19 and 20 are in register they present a complete circle of practically the diameter of the tube 15. In applying the disk 14 and tube 15 to the wire 12, the wire 12 will be initially passed through the central opening of the disk 14 and then entirely through the tube 15 after which the tube will be placed in the seat 20 in readiness to unite said tube rigidly to said wire. The block or die member 18 is shown provided with a pin 21 which is adapted to punch or force the stock of the sleeve 15 into the insulation of the wire to thereby effectually and permanently connect the two parts. Any suitable number of barbs or prongs will be thus punched from the sleeve into the insulation.

In Fig. 2 the wire 12 extends through the bushing 25 in the top of the meter 10, the bushing being held in place by a nut 26 in the meter. In this figure the barrier member is designated by 27, and its sleeve by 28, the sleeve or tube 28, however, extending upward or outward from the barrier 27. With the exception noted what is illustrated in Fig. 2 is exactly like that illustrated and already described in Fig. 1.

In Fig. 3 the meter has neither a hub nor bushing, the wire 12 extending merely through an opening therein. In this particular view the barrier is shown as consisting practically of a flat disk 29 provided with an outwardly extending sleeve 30 rigidly secured to the wire 12 and having a portion 31 on its inner side of reduced diameter adapted to tightly fit the opening in the meter through which said wire extends.

In Fig. 4 is shown a combination of devices represented in Figs. 2 and 3, the bushing 25 and nut 26 in said Fig. 4 being identically like those shown in Fig. 2. The barrier 29 and sleeve 30 of said Fig. 4 are precisely like the corresponding parts shown in Fig. 3. In Fig. 4, however, the reduced diametrical portion 31 of the barrier 29 fits closely or singly in the outer open side of the bushing 25.

What I claim is:

1. The combination of a wire, a disk through which the wire extends, said disk having a tube connected therewith and inclosing and rigidly secured to the wire, said disk constituting a barrier for an opening through which said wire extends.

2. The combination of a section of insulated wire, and a disk provided with an integral tube both surrounding the insulated portion of the wire, said tube having the stock punched therefrom into the insulation of the wire and the disk constituting a barrier for an opening through which said wire extends.

In testimony whereof I affix my signature in presence of two witnesses.

CHARLES F. BERTIG.

Witnesses:
  JOHN J. BURKE,
  GEORGE M. CARRINGTON.